United States Patent [19]
McCullough, Jr.

[11] Patent Number: 5,250,631
[45] Date of Patent: Oct. 5, 1993

[54] POLYMER COMPOSITIONS

[75] Inventor: James D. McCullough, Jr., Houston, Tex.

[73] Assignee: Shell Oil Company, Houston, Tex.

[21] Appl. No.: 769,263

[22] Filed: Oct. 1, 1991

Related U.S. Application Data

[63] Continuation-in-part of Ser. No. 664,721, Mar. 5, 1991, abandoned, which is a continuation-in-part of Ser. No. 538,062, Jun. 13, 1990, abandoned.

[51] Int. Cl.$^5$ .............. C08L 23/10; C08L 23/26; C08L 23/18; C08F 297/08
[52] U.S. Cl. .................. 525/322; 525/323; 525/240; 525/194; 525/53
[58] Field of Search ............ 525/323, 322, 240, 194

[56] References Cited

U.S. PATENT DOCUMENTS

| | | | |
|---|---|---|---|
| 3,562,790 | 2/1971 | Coover et al. | 260/876 |
| 4,334,040 | 6/1982 | Fujii et al. | 525/321 |
| 4,454,306 | 6/1984 | Fujii et al. | 525/323 |
| 4,535,125 | 8/1985 | McCullough | 525/88 |
| 4,734,459 | 3/1988 | Cecchin et al. | 525/247 |

FOREIGN PATENT DOCUMENTS

| | | |
|---|---|---|
| 0208330 | 1/1987 | European Pat. Off. |
| 383099 | 2/1989 | European Pat. Off. |
| 2596402 | 10/1987 | France |
| 58071-910 | 10/1981 | Japan |
| 58145-718-A | 2/1982 | Japan |
| 58210949A | 6/1982 | Japan |
| 58-059247 | 4/1983 | Japan |
| 1318553 | 5/1973 | United Kingdom |

*Primary Examiner*—Carman J. Seccuro, Jr.
*Attorney, Agent, or Firm*—Otto O. Meyers, III

[57] ABSTRACT

Polypropylene impact copolymer compositions and visbroken derivatives thereof demonstrate a good balance of low temperature properties and resistance to stress whitening when the homopolymer phase is at least predominantly homopolymeric polypropylene and the rubber phase comprises a major proportion of ethylene with a minor proportion of α-olefin of at least 4 carbon atoms and a minor proportion of propylene.

13 Claims, No Drawings

POLYMER COMPOSITIONS

This application is a continuation-in-part of copending application Ser. No. 664,721, filed Mar. 5, 1991 which is a continuation-in-part of copending application Ser. No. 538,062, filed Jun. 13, 1990 all abandoned.

FIELD OF THE INVENTION

This invention relates to the production of certain polypropylene compositions of good impact strength and toughness and also of improved resistance to stress whitening. More particularly, the invention relates to certain polypropylene impact copolymers produced by a two-stage reaction in which the second stage reactor product is a terpolymer of ethylene, propylene and α-olefin of at least 4 carbon atoms of particular composition and the optional further visbreaking of the resulting polypropylene impact copolymers.

BACKGROUND OF THE INVENTION

Polypropylene compositions have gained wide commercial acceptance and usage in numerous commercial applications because of the relatively low cost of the polymers and the desirable properties they exhibit. In general, polypropylene polymers, particularly polypropylene homopolymers, have the disadvantage of being brittle with low impact resistance, particularly at low temperatures. Numerous procedures have been proposed for modifying the properties of the polypropylene homopolymers to improve the impact strength and other low temperature properties. Many, if not most, of such proposals have involved the provision of a propylene/α-olefin copolymer portion in an otherwise homopolymeric polypropylene. In Liebson et al, U.S. Pat. No. 3,514,501, there is described a process for the production of block copolymers wherein, for example, a prepolymer which is homopolymeric is produced and a block which has at least one other α-olefin is grown from the prepolymer in a second polymerization step. A second approach to providing improved impact strength comprises the mixing of a polypropylene homopolymer with a propylene/ethylene copolymer. Most commercial products of high impact strength result from the production of a first polymer, usually a polypropylene homopolymer, and the production of a multi-polymeric portion, usually termed a copolymeric portion in the presence of the initial polymer product mixture which still contains active polymerization sites. Whether the resulting product is a block copolymer, a mixture of homopolymer and copolymer or of some other structure is not entirely clear. However, such products are well known in the art, are conventional and have achieved substantial commercial importance. They are often referred to as polypropylene impact copolymers, regardless of their precise structure, and are said to contain a homopolymer phase (often homopolymeric polypropylene) and a rubber phase (the copolymer portion).

Such polypropylene impact copolymers, particularly those wherein ethylene is the other α-olefin of the copolymer portion, do exhibit improved low temperature impact strength and other improved low temperature properties as well as many of the desirable properties of the homopolymer such as stiffness. However, the impact copolymers have low resistance to stress whitening in situations such as rapid impacting or the bending of fabricated parts and also have poor to moderate toughness. In the case of impact copolymers having a high ethylene content in the copolymer phase, brittle failure is often observed upon impact. These high ethylene content polymers do, however, show better resistance to stress whitening.

The difficulty of obtaining a good balance of properties in a polypropylene composition has been addressed on numerous occasions. In published European Patent Application 208,330 there are disclosed polypropylene compositions said to have improved resistance to stress whitening which comprise homopolymeric polypropylene or peroxide-degraded polypropylene having a grafted ethylene/propylene copolymer portion and, as an additional component an ester derived from a $C_{12}$–$C_{20}$ monocarboxylic acid and a polyhydric alcohol. In published Japanese Patent Application 84020522/04 there is described a mixture of polypropylene of specified melt flow and an ethylene/α-olefin copolymer wherein the molecular weight of the polypropylene has been substantially reduced by treatment with peroxide. Coover et al, U.S. Pat. No. 3,562,790, propose obtaining better properties through the provision of a ternary blend of homopolymers or copolymers and an amorphous copolymer or terpolymer of ethylene, propylene and optionally an unsaturated hydrocarbon of at least one double bond.

In copending U.S. patent application Ser. No. 471,467, filed Jan. 29, 1990, improved resistance to stress whitening is shown by polypropylene impact copolymers having particular ratios of intrinsic viscosities of the copolymer phase to the homopolymer phase.

In Cecchin et al, U.S. Pat. No. 4,734,459, there are disclosed polypropylene compositions comprising a homopolymer portion and a copolymer portion which is crystalline polyethylene and an amorphous ethylene/1-butene copolymer. Care is taken to avoid the presence of propylene in the copolymer portion although provision is made for the presence in the gas phase of a small amount of propylene, e.g., less than 5% by mole on the basis of monomers present. Although these compositions do show some improvement in low temperature properties, the crystallinity in the rubber phase would be relatively high for composition having the higher ethylene contents (in the rubber phase) needed for better stress whitening resistance, and the compositions would be expected to be overly brittle. It would be of advantage to provide improved polypropylene compositions having an improved balance of properties including better low temperature properties such as strength and also good resistance to stress whitening.

SUMMARY OF THE INVENTION

The present invention provides certain polypropylene compositions having an improved balance of properties. More particularly, the present invention provides polypropylene impact copolymers characterized by a homopolymer phase of at least predominantly homopolymeric polypropylene and a terpolymer phase comprising primarily ethylene with lesser proportions of propylene and an α-olefin of at least 4 carbon atoms.

DESCRIPTION OF THE INVENTION

The present invention comprises certain polypropylene compositions which, because of the particular composition thereof, exhibit an improved balance of properties. These compositions, produced by gas phase processes in a two-stage reaction, are characterized by a homopolymer phase and a copolymer phase of defined proportions. The homopolymer phase is predominantly homopolymeric polypropylene with an optional inclusion of a minor proportion of ethylene monomer in the polymeric unit comprising the homopolymer phase. The terpolymer phase of the compositions of the invention contain primarily ethylene units but also incorporates units of propylene and of a α-olefin of at least 4 carbon atoms.

The polymeric compositions of the invention are produced in the gas phase in the presence of a high activity, stereoregular olefin polymerization catalyst by methods which are broadly conventional. The catalysts are also broadly known, being employed in the polymerization of α-olefins of three or more carbon atoms to produce stereoregular polyolefin products. In terms conventionally employed to describe such catalysts, the high activity stereoregular catalysts contain as a first constituent a procatalyst which is a titanium-containing solid, usually a titanium-halide containing solid, and which often contains an electron donor. Suitable electron donors which may be used in the production of the procatalyst are ethers, esters, ketones, phenols, amines, amides, imines, nitriles, phosphines, arsines, stilbenes, phosphoramides or alcoholates. Among the preferred electron donors for use in the production of the procatalyst are phenols and esters, particularly alkyl esters of aromatic carboxylic acids. The use of ethyl benzoate or diisobutyl phthalate is particularly preferred. The second catalyst component is an organoaluminum compound which is uncomplexed or is partly or totally complexed with the third catalyst component which is conventionally termed a selectivity control agent. Typical selectivity control agents include esters and particularly aromatic esters, amines and particularly hindered amines, phosphates, phosphites, hindered phenols, silanes and particularly alkoxysilanes and aryloxysilanes and mixtures thereof. Alkyl esters of aromatic carboxylic acids such as ethyl p-ethylbenzoate, ethyl p-ethoxybenzoate and diisobutyl phthalate and alkoxysilanes such as propyltrimethoxysilane and diisobutyldimethoxysilanes are preferred as the third catalyst component.

Such stereoregular olefin polymerization catalysts are described in numerous patents and other references including Nestlerode et al, U.S. Pat. No. 4,728,705. Although a variety of chemical compounds are useful as constituents of the polymerization catalyst, a typical high activity stereoregular olefin polymerization catalyst contains as procatalyst a solid comprising magnesium halide, a titanium halide and the electron donor. The halide moieties of such procatalysts are customarily chloride moieties. The cocatalyst is typically a trialkylaluminum compound such as triethylaluminum or triisobutylaluminum which is often at least partially complexed with the selectivity control agent. Use of the catalysts of this type results in a stereoregular polymeric product when α-olefins of three or more carbon atoms are polymerized. The catalysts are recognized as high activity if they catalyze the production of polymers of desirable properties without the necessity of removing catalyst residues in a de-ashing step.

These catalysts are used in established processes to polymerize or copolymerize α-olefins. The processes may employ a liquid non-polymerizable diluent or alternatively may employ as liquid diluent a monomer of the polymerization. To obtain the improved compositions of the invention, however, it is desirable to utilize a gas phase process.

A number of gas phase processes are known and conventional but one such process which is illustratively and suitably used to produce the polypropylene impact copolymers of the invention is described by Goeke et al, U.S. Pat. No. 4,379,759, which involves a fluidized bed, gas phase reaction. The Goeke et al disclosure, and the references cited therein relative to gas phase processes are incorporated herein by reference. A gas phase process is typically operated by charging to a suitable reactor an amount of pre-formed polymer particles and lesser amounts of catalyst components. The olefin or olefins to be polymerized are passed as a gas through the particle bed under polymerization conditions at a rate sufficient to initiate polymerization. Upon passing through the particle bed, the unreacted gas is withdrawn from the reactor and recycled together with make-up feed gas. As the catalyst is lost through incorporation of minute amounts of catalyst within the polymer product, additional catalyst is provided to the reactor, often through the use of an inert transport gas such as nitrogen or argon. The reaction temperature is selected to be below the sintering temperature of the polymer particles and is controlled by an external heat exchanger in a gas cycle loop. Reaction temperatures from about 30° C. to about 120° C. may be used, with reaction temperatures from about 50° C. to about 90° C. being more commonly used. The reaction pressure is generally up to about 1000 psi although reaction pressures from about 100 psi to about 400 psi are preferred. The precise control of reaction conditions as well as the addition of catalyst and feed gas and the recycle of unreacted monomer is within the skill of the art. An additional means of reaction and product control is achieved by the provision for the addition of molecular hydrogen to the reactor and thus the reaction system. The addition of molecular hydrogen serves to control the molecular weight of the product, most likely by serving as a chain transfer agent. The use of molecular hydrogen to control the molecular weight of the polymer is also within the skill of the art.

The desired polymeric products are obtained as particulate matter formed by growth of polymer product on the polymer particles provided to the fluidized bed or as particles formed in the reactor. The polymer particles are removed from the reactor at a rate which is substantially equivalent to the rate of polymer production and the particles are passed to a subsequent reaction zone or are finished by conventional methods prior to use.

It is likely possible although impractical to produce the polypropylene impact copolymers of the invention in a single reactor by control of the feed gas and recycle of unreacted monomer and polymeric product. However, it is more common to operate the gas phase process for production of the compositions of the invention as a two-stage process wherein each stage operates in the gaseous phase in one or more separate reactors. In such a modification, the homopolymeric portion of the impact copolymer is initially produced as described above in a suitable gas phase reactor which generally but not necessarily employs molecular hydrogen to control the molecular weight of the product. This initial homopolymer product containing active catalyst sites is then passed to a second gas phase reactor containing a second fluidized bed. A portion of unreacted monomer from the first reaction stage may be passed to the second stage together with the monomers to be employed in the production of the terpolymer phase. The production of the terpolymer or rubber phase takes place in the second reaction stage where it may also be desirable to provide molecular hydrogen to control the molecular weight of the terpolymer phase. In the two-stage gas phase polymerization process, two or more gas phase homopolymer or terpolymer reactors can be used in various sequential or parallel arrangements by engineering procedures known in the art.

The homopolymer phase of the polypropylene compositions is predominantly but not necessarily entirely homopolymer. To obtain particular properties for polymers used in particular applications it may be desirable to incorporate in the otherwise homopolymer portion of the impact copolymer compositions a small amount, e.g., up to about 6% by weight, of a second α-olefin having up to 4 carbon atoms inclusive, such as ethylene or 1-butene. The incorporation of the optional small amounts of second α-olefin is by conventional methods and serves to modify but not substantially alter the properties of the homopolymer phase. In the embodiments where a small amount of second α-olefin is incorporated, although technically a copolymer, the product is still referred to as the homopolymer phase. The optional second α-olefin is preferably ethylene, preferably incorporated in an amount up to about 2% by weight, with from about 4% by weight to about 6% being more preferred. However, the homopolymer phases which are substantially homopolymeric polypropylene, i.e., phases produced in the substantial absence of second α-olefin, are preferred.

The second phase or rubber phase is a terpolymer phase comprising moieties of ethylene, propylene and a second α-olefin of at least 4 carbon atoms. The ethylene moieties of are present in a major amount with moieties of the α-olefin of at least 4 carbon atoms being present in lesser amounts and moieties of propylene present also in lesser amounts. The ethylene content is somewhat critical since polypropylene impact copolymers of too low an ethylene content in the rubber phase lack the needed degree of protection against stress whitening, and too high an ethylene content in the rubber phase results in brittle failure. In the impact copolymers of the invention the ethylene content of the rubber phase is suitably from about 70% by weight to about 95% by weight based on total rubber phase, and ethylene contents from about 80% by weight to about 94% by weight on the same basis are preferred, and an ethylene content from about 85% by weight to about 90% weight being more preferred. The α-olefin of at least 4 carbon atoms is illustrated by 1-butene, 1-hexene, 1-pentene and 4-methyl-1-pentene. The preferred α-olefin of at least 4 carbon atoms is 1-butene. The proportion of α-olefin of at least 4 carbon atoms which is present in the rubber phase is suitably from about 1% by weight to about 26% by weight based on total rubber phase. Proportions of α-olefin of at least 4 carbon atoms from about 1% by weight to about 15% by weight on the same basis are preferred and from about 5% by weight to about 10% by weight being more preferred. The preferred α-olefin having at least 4 carbon atoms is 1-butene. The third component of the rubber phase is propylene which is present in an amount of at least about 4% by weight based on total rubber phase, with at least about 5% by weight of propylene being preferred and from about 6% by weight to about 10% by weight being more preferred. It is possible that the rubber phase of the impact copolymers of the invention could contain small amounts of some other polymerizable monomer including a second α-olefin of at least 4 carbon atoms. In the preferred polypropylene impact copolymers of the invention, however, the rubber phase consists essentially of moieties of ethylene, one α-olefin of at least 4 carbon atoms, preferably 1-butene, and propylene and the total proportion of such moieties is substantially 100%.

The production of the terpolymer phase of the polypropylene impact copolymers is broadly within the skill of the art. The initial homopolymer phase product containing active polymerization sites is typically passed to a second gas phase reactor where the monomers required to produce the rubber phase are present. Ethylene and α-olefin of at least 4 carbon atoms are introduced by conventional methods. The product from production of the homopolymer phase will often contain propylene. Depending upon the particular quantity of any propylene present in the homopolymer phase product, the product is partially degassed before introduction to the second reaction stage or is passed directly into the second reactor with additional propylene being added if necessary to provide the desired proportion of propylene in the rubber phase product. It may also be desirable on most occasions to provide molecular hydrogen to the second stage reactor to provide control of the molecular weight of the rubber phase.

The polypropylene impact copolymers of the invention therefore comprise polymers produced by a gas phase process having two phases. The homopolymer phase is predominantly polypropylene, optionally with small amounts of other olefin present. The rubber phase is terpolymeric in character wherein ethylene units are present in major proportions with a lesser proportion of units of α-olefin of at least 4 carbon atoms and an even smaller proportion of propylene units. Sufficient propylene monomer is added to the gas phase of the second reactor such that the total propylene monomer content is present in the gas phase in an amount of at least 8 mole % based on total monomers content in the gas phase of the second reactor. The rubber phase (i.e. terpolymer phase) comprises from about 1% by weight to about 30% by weight of the total polymer composition. Proportions of the rubber phase from about 5% by weight to about 26% by weight on the same basis are preferred and 10% by weight to about 22% by weight being more preferred. Although the polymers of the invention are literally at least terpolymers, they are appropriately termed polypropylene impact copolymers because of the generally similar nature of the polymers of the invention to the more conventional propylene/ethylene impact copolymers.

The impact copolymers as described above when produced by typical gas phase processes will have melt flows, expressed in dg/min as determined by a conventional test procedure such as ASTM-1238, Cond. L, of from about 1 to about 70. A melt flow of from about 16 to about 70 being preferred and from about 20 to about 60 being more preferred. For some particular product applications it is desirable to have impact copolymer of higher melt flow which is indicative of lower molecular weight. Increase of the melt flow of a polyolefin polymeric product is frequently accomplished by the use of molecular hydrogen as is also described above. However, an alternative method of lowering the molecular weight of the impact copolymer is within the skill of the art by procedures which involve treatment at elevated temperatures, e.g., above 180° C., with peroxide, also termed "visbreaking". In general, the use of visbreaking to lower molecular weight results in a lowering of resistance to stress whitening. When the impact copolymers of this invention are subjected to peroxide treatment, however, the resistance of the resulting products to stress whitening is comparable to that of non-visbroken conventional impact products. A second desirable property of the impact copolymers of the invention is that of gloss. With conventional propylene-ethylene impact copolymers of high ethylene contents like the polymers of the invention, gloss is lost upon visbreaking. The good gloss of the impact polymers of the invention is, however, retained upon peroxide treatment to lower molecular weight.

The visbroken impact copolymer product of the present invention has a xylene insoluble (non-gel) content equal to or less than 4 weight percent, when taken up in hot xylene, according to modified FDA regulations 21 CFR 177.1520. It is preferred that the visbroken impact copolymer have a xylene insoluble (non-gel) content equal to or less than 2 weight percent, with a xylene insoluble (non-gel) content equal to or less than 1 weight percent being more preferred. The xylene soluble fraction of the visbroken impact copolymer has an intrinisc viscosity of no more than 1.46 dl/g in decalin at 135° C.

The polymer compositions of the present invention which have not been subjected to visbreaking are characterized by having a high modulus, in particular, a one percent secant modulus according to ASTM D-790, Procedure A, in excess of 95,000 pounds per square inch (psi). In addition, the homopolymer phase is termed crystalline, having a xylene solubles content equal to or less than seven weight percent, preferably less than 5 weight percent, according to FDA Regulations 21 CFR 177.1520, by the "maximum soluble fraction in xylene" procedure described therein. The terpolymer phase of the present invention has polyethyleneic-type crystallinity defined by the integrated area of the polyethyleneic melting peak as measured with a Perkin-elmer DSC 7 Series Thermal Analysis System, where said peak melts distinctly from the polypropyleneic peak, with the former displaying peak melting within or near the range of about 120° to about 135° C. This crystallinity of said homopolymer phase relative to said terpolymer phase is between about 0.8 and 2.0 as determined by the ratio of the respective crystallinities (endothermic areas) of the polypropyleneic and polyethyleneic types as corrected by division of each by the relative amount of that phase. The preferred ratio of crystallinity is about 0.8 to 1.5, more preferably about 1 to about 1.3. The polyethyleneic-type crystallinity is measured as above, using the second heating at 10° C./min in a temperature program comprising heating a first time at 10° C./min from 0° C. to 220° C., holding for 5 minutes at 220° C., cooling at 10° C./min to 0° C., and thence heating the second time at 10° C./min to 220° C. for measurements. The polypropyleneic-type crystallinity is defined by the integrated area of the polypropyleneic melting peak where said peak displays peak melting within or near the range of about 150° C. to about 170° C. for compositions of this invention.

In addition, the preferred polymer materials of this invention which have not been subjected to visbreaking, have ratios of intrinsic viscosities of the terpolymer (polyethyleneic-type) phase to that of the homopolymer (polypropyleneic-type) phase of about 1.2 to about 3.0 to assure good impact strength and intrinsic viscosities of about 1.2 to 1.6 being preferred, intrinsic viscosities of about 1.4 to 1.6 being more preferred.

The term intrinsic viscosity as used herein is used in its conventional sense to indicate the viscosity of a solution of a material, expressed in dl/g, in this case a solution of a polymer, in a given solvent at a given temperature, when the polymer is at infinite dilution. According to the ASTM standard test method D 1601-78, its measurement involves a standard capillary viscosity measuring device, in which the viscosity of a series of concentrations of the polymer in the solvent at the given temperature are determined. In the case of the polymer of the present invention, decalin (decahydronaphthalene) is an illustrative suitable solvent and a typical temperature is 135° C. From the values of the viscosity of solutions of varying concentration, the "value" at infinite dilution can be determined by extrapolation. In the case of the present polypropylene impact copolymers, the homopolymer portion is initially produced and the intrinsic viscosity of that portion is measured directly. The intrinsic viscosity of the terpolymer portion cannot be measured directly. The intrinsic viscosity of the total copolymer is determined and the intrinsic viscosity of the terpolymer portion is calculated as the quotient of the intrinsic viscosity of the total copolymer less the fraction of homopolymer times its intrinsic viscosity, all divided by the fraction of the total copolymer which is terpolymer. The formula is $$[\eta]_{terpol} = \frac{\eta_{prod} - (1 - F_c)[\eta]_{homo}}{F_c}$$

where $F_c$ is the fraction of terpolymer (expressed as a fraction here). This fraction is also determined by conventional procedures involving infrarred analysis or reactor heat balance.

The visbroken polymer products of this invention are obtained by visbreaking the polymer compositions of the present invention that have a melt flow of at least 1.8 dg/min. The melt flow ratio of the resulting visbroken product to the starting non-visbroken polymer product is at least 2.5.

The polymer compositions of the invention as well as the visbroken derivatives thereof are characterized by the good impact resistance and other good low temperature properties which are characteristic of conventional polypropylene impact copolymers. However, in contrast with the conventional materials, the compositions of the invention exhibit improved resistance to stress whitening and gloss which is of importance when the polymeric composition is employed to produce a final article where outward appearance is important. In addition to generally good tensile properties, the compositions of the invention may exhibit strain hardening, i.e., the tensile strength at break is higher than the tensile strength at yield. This property is particularly desirable when thermoplastic-elastomeric mid-range to higher range modulus polymers are desired for applications requiring good resilience, ductility and toughness as exemplified by automotive bumpers and air dams.

The impact copolymers of the invention may suitably incorporate a variety of additives such as stabilizers, antioxidants, fillers, colorants, nucleating agents and mold release agents which are conventionally employed in commercial polypropylene compositions. The compositions of the invention are processed by conventional procedures used for thermoplastic materials such as injection molding, extrusion, thermoforming and related processes. Among particular applications for the compositions are the production of molded and extruded automotive parts, small appliance housings, film of improved clarity and gloss and stackable trays and luggage of improved toughness and reduced stress whitening.

The invention is further illustrated by the following Comparative Experiments (not of the invention) and the following Illustrative Embodiment which should not be regarded as limiting.

A number of samples of polypropylene impact copolymer, both within and without the scope of the invention, were produced by conventional two stage gas phase processes and evaluated, primarily by conventional procedures. The stress whitening was evaluated by preparing injection molded disks, 2.5 inches in diameter and 0.125 inches thick, from each sample. A standard Gardner impact apparatus with the ring removed was used to drop a weight upon an impactor, which contacts each disk, from a determined height and stress whitening was determined by measuring the diameter of the whitened spot on the opposite side of the disk. All such determinations were made 24 hours after molding. A two pound weight was used from heights of 5, 10 and 15 inches to obtain impacts of 10 in-lb, 20 in-lb and 30 in-lb respectively. The value reported was an average of 3 determinations.

In certain Runs of the Illustrative Embodiment the initial impact copolymer composition was visbroken by one of two procedures. In a first procedure, termed "1", a sample of the polymer is powder is heated with 2,5-dimethyl-2,5-bis(t-butylperoxy)hexane in one extrusion pass. In a second procedure, termed "2", the polymer in the form of pellets from an extrusion is treated with the same peroxide during a second extruder pass.

COMPARATIVE EXPERIMENT I

To serve as a control, property determinations were conducted on two more conventional polypropylene impact copolymer products having a rubber phase which comprised ethylene and propylene. No α-olefin of at least 4 carbon atoms was present. The results of these determinations are shown in Table I. Test specimens were prepared by injection molding with an Arburg reciprocating screw machine.

TABLE I

| Control Run No. | 1 | 2 |
|---|---|---|
| Melt Flow | 3.5 | 4.0 |
| Tensile Properties, 2 in/min | | |
| Yield, psi | 4467 | 4130 |
| Break, psi | 2416 | 2832 |
| % Elongation | | |
| @ Yield | 8.6 | 7.1 |
| @ Break | 108 | 228 |
| Izod, Notched, ft-lb/in | | |
| 23° C. | 0.84 | 1.5 |
| 0° C. | 0.49 | 0.73 |
| −20° C. | 0.38 | 0.67 |
| Gardner Impact, in-lb, −30° C. | 133 | 140 |
| Gloss, @ 60 degree angle | 29.4 | 47.5 |
| 1% Secant Modulus @ 0.05 in/min, psi | 162,347 | 177,414 |
| Stress Whitening, dia, in | | |
| 10 in-lb | 0 | 0.44 |
| 20 in-lb | 0.08 | 0.61 |
| 30 in-lb | 0.08 | 0.67 |
| C₂ in Homopolymer, % wt. | 1.5 | 0 |
| % wt Copolymer Phase | 25 | 14.5 |

TABLE I-continued

| Control Run No. | 1 | 2 |
|---|---|---|
| % wt Ethylene in Copolymer Phase | 95 | 60 |

ILLUSTRATIVE EMBODIMENT

Property determinations were also made for a number of compositions within the scope of the invention, before and after visbreaking. The results are shown in Tables II–V, wherein the results shown in each Table are for the same polymer before and after visbreaking.

In each instance where applicable, reactor powder was dry mixed with additives, including 1000 ppm IRGANOX ® 1010, 1000 ppm of IRGAFOS ® 168 and 800 ppm of calcium stearate. For visbroken compositions the peroxide, 2,5-dimethyl-2,5-bis(t-butylperoxy)-hexane, was added as a 50:50 blend with mineral oil. For formulations of the "A" type, the peroxide-oil was dry mixed with the polymer powder and additives. For "B" type formulations, the peroxide-oil was mixed with pellets, the latter having been prepared from one powder-to-pellets extrusion pass.

All extrusions were conducted under nitrogen (bleed to hopper and throat) on a 1¼ in. Brabender extruder using a mixing screw and an 80 mesh screen. Extruder melt temperatures were maintained at about 240° C. Test specimens were made by injection molding with an Arburg reciprocating screw machine.

TABLE II

| Control Run No. | 3 | 3A | 3B |
|---|---|---|---|
| Visbroken | No | Yes-1 | Yes-2 |
| Melt Flow | 1.9 | 4.9 | 4.9 |
| Tensile Properties, 2 in/min | | | |
| Yield, psi | 3051 | 2739 | 2919 |
| Break, psi | 3405 | 2603 | 2794 |
| % Elongation. | | | |
| @ Yield | 12.5 | 9.23 | 9.63 |
| @ Break | 431 | 426 | 432 |
| Izod, Notched, ft-lb/in | | | |
| 23° C. | 14.2 | 12.5 | 11.6 |
| 0° C. | 6.33 | 1.93 | 1.94 |
| −20° C. | 1.35 | 1.26 | 1.31 |
| Gardner Impact, in-lb, −30° C. | 283 | 256 | 259 |
| Gloss, @ 60 degree angle | 43.2 | 38.0 | 36.0 |
| 1% Secant Modulus @ 0.05 in/min, psi | 99,805 | 90,375 | 91,321 |
| Relative Crystallinity, Homopolymer Phase to Terpolymer Phase | 1.24 | | |
| Stress Whitening, dia, in | | | |
| 10 in-lb | 0.22 | 0.44 | 0.34 |
| 20 in-lb | 0.33 | 0.57 | 0.50 |
| 30 in-lb | 0.43 | 0.62 | 0.61 |
| C₂ in Homopolymer, % wt. | 1.1 | | |
| % wt Terpolymer Phase | 30 | | |
| % wt Ethylene in Terpolymer Phase | 78 (86.9% m) | | |
| % wt Butylene in Terpolymer Phase | 17 (9.4% m) | | |
| % wt Propylene in Terpolymer Phase | 5 (3.7% m) | | |

TABLE III

| Control Run No. | 4 | 4A | 4B |
|---|---|---|---|
| Visbroken | No | Yes-1 | Yes-2 |
| Melt Flow | 2.2 | 5.2 | 5.0 |
| Tensile Properties, 2 in/min | | | |
| Yield, psi | 3207 | 2903 | 2980 |
| Break, psi | 3450 | 2762 | 2768 |
| % Elongation. | | | |

TABLE III-continued

| Control Run No. | 4 | 4A | 4B |
|---|---|---|---|
| @ Yield | 11.7 | 10.3 | 10.0 |
| @ Break | 431 | 425 | 414 |
| Izod, Notched, ft-lb/in | | | |
| 23° C. | 13.0 | 2.89 | 2.90 |
| 0° C. | 1.75 | 1.53 | 1.60 |
| −20° C. | 1.07 | 1.03 | 1.08 |
| Gardner Impact, in-lb, −30° C. | 272 | 239 | 247 |
| Gloss, @ 60 degree angle | 42.2 | 42.9 | 42.9 |
| 1% Secant Modulus @ 0.05 in/min, psi | 107,044 | 97,637 | 99,780 |
| Relative Crystallinity, Homopolymer Phase to Terpolymer Phase | 1.09 | | |
| Stress Whitening, dia in | | | |
| 10 in-lb | 0.26 | 0.45 | 0.40 |
| 20 in-lb | 0.37 | 0.59 | 0.60 |
| 30 in-lb | 0.46 | 0.67 | 0.65 |
| C$_2$ in Homopolymer, % wt. | 1.0 | | |
| % wt Terpolymer Phase | 24 | | |
| % wt Ethylene in Terpolymer Phase | 73 (84.2% m) | | |
| % wt Butylene in Terpolymer Phase | 26 (15.0% m) | | |
| % wt Propylene in Terpolymer Phase | 1 (0.8% m) | | |

TABLE IV

| Control Run No. | 5 | 5A | 5B |
|---|---|---|---|
| Visbroken | No | Yes-1 | Yes-2 |
| Melt Flow | 1.8 | 5.0 | 5.3 |
| Tensile Properties, 2 in/min | | | |
| Yield, psi | 3003 | 2771 | 2704 |
| Break, psi | 3358 | 2703 | 2628 |
| % Elongation, | | | |
| @ Yield | 12.9 | 10.2 | 9.89 |
| @ Break | 431 | 427 | 431 |
| Izod, Notched, ft-lb/in | | | |
| 23° C. | 14.6 | 13.1 | 12.6 |
| 0° C. | 2.36 | 1.97 | 2.08 |
| −20° C. | 1.31 | 1.42 | 1.31 |
| Gardner Impact, in-lb, −30° C. | 293 | 259 | 248 |
| Gloss, @ 60 degree angle | 42.4 | 40.0 | 39.8 |
| 1% Secant Modulus @ 0.05 in/min, psi | 98,566 | 89,121 | 90,318 |
| Relative Crystallinity, Homopolymer Phase to Terpolymer Phase | | | |
| Stress Whitening, dia. in | | | |
| 10 in-lb | 0.24 | 0.47 | 0.48 |
| 20 in-lb | 0.37 | 0.58 | 0.59 |
| 30 in-lb | 0.45 | 0.67 | 0.66 |
| C$_2$ in Homopolymer, % wt. | 1.2 | | |
| % wt Terpolymer Phase | 28 | | |
| % wt Ethylene in Terpolymer Phase | 78 (86.6% m) | | |
| % wt Butylene in Terpolymer Phase | 15 (8.3% m) | | |
| % wt Propylene in Terpolymer Phase | 7 (5.1% m) | | |

TABLE V

| Control Run No. | 6 | 6A | 6B |
|---|---|---|---|
| Visbroken | No | Yes-1 | Yes-2 |
| Melt Flow | 1.8 | 5.3 | 5.2 |
| Tensile Properties, 2 in/min | | | |
| Yield, psi | 3106 | 2970 | 2800 |
| Break, psi | 3416 | 2810 | 2734 |
| % Elongation, | | | |
| @ Yield | 11.7 | 9.56 | 9.82 |
| @ Break | 431 | 421 | 431 |
| Izod, Notched, ft-lb/in | | | |
| 23° C. | 14.1 | 12.1 | 9.89 |
| 0° C. | 1.97 | 1.92 | 1.87 |
| −20° C. | 1.32 | 1.31 | 1.37 |
| Gardner Impact, in-lb, −30° C. | 283 | 258 | 250 |
| Gloss, @ 60 degree angle | 42.3 | 40.2 | 42.3 |
| 1% Secant Modulus @ 0.05 in/min, psi | 102,444 | 92,707 | 94,372 |
| Relative Crystallinity, Homopolymer Phase to Terpolymer Phase | 1.19 | | |
| Stress Whitening, dia, in | | | |
| 10 in-lb | 0.30 | 0.46 | 0.50 |
| 20 in-lb | 0.43 | 0.60 | 0.61 |
| 30 in-lb | 0.50 | 0.68 | 0.69 |
| C$_2$ in Homopolymer, % wt. | 1.1 | | |
| % wt Terpolymer Phase | 26 | | |
| % wt Ethylene in Terpolymer Phase | 68 (80.3% m) | | |
| % wt Butylene in Terpolymer Phase | 29 (17.3% m) | | |
| % wt Propylene in Terpolymer Phase | 3 (2.4% m) | | |

COMPARATIVE EXPERIMENT II

Property determinations were made of a polymer composition which was not within the scope of the present invention because of the absence of 1-butene moieties in the rubber phase. The results are shown in Table VI for this composition before and after visbreaking.

TABLE VI

| Control Run No. | 7 | 7A | 7B |
|---|---|---|---|
| Visbroken | No | Yes-1 | Yes-2 |
| Melt Flow | 1.9 | 5.3 | 5.5 |
| Tensile Properties, 2 in/min | | | |
| Yield, psi | 3476 | 3247 | 3209 |
| Break, psi | 2815 | 2582 | 2553 |
| % Elongation, | | | |
| @ Yield | 11.5 | 8.74 | 8.70 |
| @ Break | 332 | 304 | 338 |
| Izod, Notched, ft-lb/in | | | |
| 23° C. | 6.60 | 1.57 | 1.52 |
| 0° C. | 0.97 | 0.88 | 0.92 |
| −20° C. | 0.66 | 0.72 | 0.73 |
| Gardner Impact, in-lb, −30° C. | 186 | 141 | 134 |
| Gloss, @ 60 degree angle | 43.0 | 34.8 | 34.1 |
| 1% Secant Modulus @ 0.05 in/min, psi | 116,091 | 109,799 | 109,078 |
| Relative Crystallinity, Homopolymer Phase to Copolymer Phase | 1.20 | | |
| Stress Whitening, dia. in | | | |
| 10 in-lb | 0.20 | 0.43 | 0.45 |
| 20 in-lb | 0.32 | 0.57 | 0.61 |
| 30 in-lb | 0.40 | 0.63 | 0.65 |
| C$_2$ in Homopolymer, % wt. | 1.1 | | |
| % wt Copolymer Phase | 26 | | |
| % wt Ethylene in Copolymer Phase | 78 | | |
| % wt Propylene in Copolymer Phase | 22 | | |

EXPERIMENT III

Izod property determinations were made of both polymer compositions within the scope of the invention (Sample Nos. 2 and 3) and polymer compositions not within the scope of the present invention (Sample Nos. 1 and 4) due to the weight percentage of propylene in the rubber phase. The results are shown in Table VII for these compositions before and after visbreaking. The mole % propylene monomer in the gas phase of the second reactor is based on total monomers content in the gas phase of the second reactor.

TABLE VII

| Control Run No. | 1 | 2 | 3 | 4 | 5 |
|---|---|---|---|---|---|
| % wt Ethylene in Terpolymer Phase | 68 | 78 | 78 | 73 | 78 |
| % wt Propylene in Terpolymer Phase | 3 | 7 | 5 | 1 | 22 |
| mole % Propylene in Gas Phase of Second Reactor | 9.74 | 7.98 | 8.22 | 8.26 | 25.96 |
| % wt α-olefin (1-butene) in Terpolymer Phase | 29 | 15 | 17 | 26 | 0 |
| Izod, Notched, 23° C., ft-lb/in Pre-Visbroken | 14.1 | 14.6 | 14.2 | 13.0 | 6.6 |
| Visbroken | 12.1 | 13.1 | 12.5 | 2.9 | 1.6 |

What is claimed is:

1. A polypropylene impact polymer comprising
   a) a homopolymer phase of predominantly homopolymeric polypropylene which is prepared in a first reactor, and
   b) a terpolymer phase having polyethyleneic-type crystallinity prepared from three different monomers in a second reactor, said terpolymer phase containing 80 to 94 weight percent ethylene units ($E_c$), 1 to 15 weight percent of units ($B_c$) of an α-olefin of at least four carbon atoms and at least five weight percent propylene units ($P_c$) wherein $P_c$ plus $B_c$ equals 100 minus $E_c$, and wherein;
   i) the relative crystallinity of said homopolymer phase to said terpolymer phase is between 0.8 and 2.0,
   ii) said terpolymer phase comprises from about 5% by weight to about 26% by weight of said impact polymer,
   iii) said homopolymer phase has a xylene solubles content equal to less than seven weight percent,
   iv) said impact polymer is prepared by the sequential polymerization of said homopolymer phase then said terpolymer phase, wherein said three different monomers are polymerized in the presence of said predominantly homopolymeric crystalline polypropylene,
   v) the ratio of the intrinsic viscosity of the terpolymer phase to the homopolymer phase is about 1.2 to about 3.0,
   vi) propylene monomer is present in the second reactor at an amount of at least 8 mole % based on total monomers content of the second reactor, and
   vii) said impact polymer has a melt flow from about 1 to about 70 dg/min.

2. A polypropylene impact polymer comprising
   a) a homopolymer phase of predominately homopolymeric polypropylene and up to 2% by weight of a second α-olefin of up to 4 carbon atoms inclusive, wherein said homopolymeric phase being prepared in a first reactor, and
   b) a terpolymer phase having polyethylenic-type crystallinity prepared from three different monomers in a second reactor, said terpolymer phase containing 80 to 94 weight percent ethylene units, 1 to 15 weight percent of units of an α-olefin of at least four carbon atoms and at least five weight percent propylene units wherein the sum of the ethylene units plus the units of the α-olefin of at least four carbon atoms equals 100 minus the propylene units, and wherein;
   i) the relative crystallinity of said homopolymer phase to said terpolymer phase is between 0.8 and 2.0,
   ii) said terpolymer phase comprises from about 5% by weight to 26% by weight of said impact polymer,
   iii) said homopolymer phase has a xylene solubles content equal to less than seven weight percent,
   iv) said impact polymer is prepared by the sequential polymerization of said homopolymer phase then said terpolymer phase, wherein said three different monomers are polymerized in the presence of said homopolymer phase,
   v) the ratio of the intrinsic viscosity of the terpolymer phase to the homopolymer phase is about 1.2 to about 3.0,
   vi) said propylene is present in the second reactor at an amount of at least 8 mole % based on total monomers content of the second reactor, and
   vii) said impact polymer has a melt flow from about 1 to about 70 dg/min.

3. The impact polymer of claim 2 wherein the terpolymer phase contains from about 85% by weight to about 90% by weight of ethylene based on total rubber phase.

4. The impact polymer of claim 1 wherein the α-olefin of at least 4 carbon atoms is present in an amount from about 1% by weight to about 10% by weight based on total terpolymer phase.

5. The impact polymer of claim 1 wherein the propylene is present in an amount from about 6% by weight to about 10% by weight based on total terpolymer phase.

6. The impact polymer of claim 1 wherein any second α-olefin present in the homopolymer phase is ethylene.

7. The impact polymer of claim 1 wherein the α-olefin of at least 4 carbon atoms of the terpolymer phase is 1-butene.

8. The impact polymer of claim 1 wherein said homopolymer phase is prepared in a first gas phase reactor and said terpolymer phase is prepared in a second gas phase reactor.

9. The impact polymer of claim 1 prepared with a stereoregular olefin polymerization catalyst comprising a magnesium chloride/titanium chloride/electron donor solid component, a trialkylaluminum cocatalyst component and a selectivity control agent.

10. The impact polymer of claim 1 wherein said relative crystallinity is between 0.8 and 1.5.

11. The impact polymer of claim 10 wherein said relative crystallinity is between 1 and 1.3.

12. A polypropylene impact polymer comprising
   a) a homopolymer phase of predominantly homopolymer polypropylene and
   b) a terpolymer phase having polyethyleneic crystallinity prepared from three different monomers, said phase containing 80 to 94 weight percent ethylene units ($E_c$), 1 to 15 weight percent of units ($B_c$) of an α-olefin of at least four carbon atoms and at least five weight percent propylene units ($P_c$), said terpolymer phase comprises from about 5% by weight to about 26% by weight of said impact polymer,
   wherein said visbroken impact polymer is prepared by the sequential polymerization of said homopolymer phase and then the subsequent polymerization of three different monomers in the presence of said homopolymeric polypropylene to produce a polymer material having a melt flow of at least 1.8 dg/min and then visbreaking said resulting polymeric material such that the melt flow of the visbroken impact polymer to the polymeric material is at least 2.5, said visbroken impact polymer has a xylene insolubles content equal to or less than 4 weight percent.

13. The visbroken impact polymer of claim 12 wherein the the homopolymer phase is an otherwise homopolymer portion containing up to 2% by weight of a second α-olefin of up to 4 carbon atoms inclusive.

* * * * *